(12) United States Patent
Neubrand

(10) Patent No.: US 6,416,111 B1
(45) Date of Patent: *Jul. 9, 2002

(54) CROSS FOLDING CONVERTIBLE TOP

(75) Inventor: Frank G. Neubrand, West Bloomfield, MI (US)

(73) Assignee: CTS Fahrzeug Dachsysteme GmbH, Rochester Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/779,888

(22) Filed: Feb. 8, 2001

(51) Int. Cl.$^7$ .................................................. B60J 7/00
(52) U.S. Cl. .................... 296/107.09; 296/107; 296/117
(58) Field of Search ............................ 296/107.09, 105, 296/109, 118, 116, 117, 121–122, 108

(56) References Cited

U.S. PATENT DOCUMENTS

| | | | | |
|---|---|---|---|---|
| 2,172,303 A | * | 9/1939 | Uebergang | 296/118 |
| 2,794,672 A | * | 6/1957 | Burzi | 296/107 |
| 4,573,732 A | * | 3/1986 | Muscat | 296/108 |
| 4,712,828 A | * | 12/1987 | Albrecht | 296/121 |
| 4,720,133 A | * | 1/1988 | Alexander et al. | 296/117 |
| 4,929,015 A | * | 5/1990 | Bauer | 296/116 |
| 5,004,291 A | * | 4/1991 | Bauer et al. | 296/116 |
| 5,335,959 A | * | 8/1994 | Schrader et al. | 296/108 |
| 5,667,269 A | * | 9/1997 | Prenger et al. | 296/107 |
| 5,829,821 A | * | 11/1998 | Aydt et al. | 296/107 |
| 5,903,119 A | * | 5/1999 | Laurain et al. | 296/107 |
| 6,039,382 A | * | 3/2000 | Mather et al. | 296/107.08 |
| 6,048,021 A | * | 4/2000 | Sautter, Jr. | 296/117 |
| 6,237,986 B1 | | 5/2001 | Neubrand et al. | |

FOREIGN PATENT DOCUMENTS

| | | |
|---|---|---|
| DE | 3837522 A1 * | 5/1990 |
| DE | 298 23 383 U1 | 6/1999 |
| DE | 199 11 541 A1 | 5/2000 |

* cited by examiner

*Primary Examiner*—Ken Patel
(74) *Attorney, Agent, or Firm*—Brooks & Kushman P.C.

(57) ABSTRACT

A convertible top having right and left side rails that fold toward each other as the convertible top is retracted. A segmented one bow is articulated to allow the side rails to converge and move from an extended position wherein they extend longitudinally relative to the vehicle to a retracted position wherein the side rails extend transversely.

12 Claims, 5 Drawing Sheets

CROSS FOLDING CONVERTIBLE TOP

CROSS-REFERENCE TO RELATED APPLICATIONS

This application claims priority to U.S. Pat. No. 6,237, 986, issued May 29, 2001 which claims priority to German Patent No. DE 19911 541 A1, published Mar. 16, 1999 which claims priority to German Patent No. DE 298 23 383 U1, published Nov. 14, 1998.

BACKGROUND OF THE INVENTION

1. Field of the Invention

The present invention relates to a soft top convertible top for a vehicle.

2. Background Art

Convertible tops of the "soft top" type generally have a top stack linkage that comprises segmented side rails that are interconnected by a plurality of bows. The top stack linkage retracts with the segmented side rails being sequentially lifted, and then lowered into a rear storage area. The segments of the side rails carry their associated bows rearwardly in a generally linear retraction path. The "number one bow" is normally a one piece bow that is relatively rigidly connected to the forward end of the side rails. When the top stack is retracted, the number one bow moves from the windshield header rearwardly into a storage compartment located behind the rearmost seats of the vehicle.

A convertible top must establish an effective seal with the upper edges of the vehicle windows and the windshield. Prior art segmented side rails have generally required segmented seals to establish a seal between the side rails and the upper edges of the vehicle windows. Separations between adjacent seal segments necessitated by the segmented construction of the side rails create potential leak paths for water. While effective sealing systems have been developed to eliminate water leakage problems, this is a continuing concern in the design and construction of convertible tops.

Segmented side rails also include many parts that must be formed to critical tolerances and subjected to rigorous quality control to assure reliable operation of the convertible top. The number of critical parts in conventional convertible tops and in particular the number of parts making up the side rails and linkages between side rail segments increases the cost of a convertible top.

What is needed is a convertible top having a one piece side rail that may be sealed by a one piece seal. It would also be desirable to provide a convertible top that minimizes the number of components required to form the convertible top and that also minimize the number of parts required to form the side rails of the convertible top.

These and other problems and objectives are addressed by the applicant's invention as summarized below.

SUMMARY OF THE INVENTION

According to the present invention, a convertible top is provided for a vehicle having a passenger compartment and a storage area for the convertible top. The convertible top includes a top stack linkage that is movable between an extended position and a retracted position. The top stack linkage has a plurality of bows that extend transversely between a right side rail and a left side rail. The side rails extend longitudinally relative to the vehicle when the top stack linkage is in the extended position. A first one of the bows is articulated in at least two places and is received by the windshield header when the top stack linkage is in its extended position. The side rails each have a forward end and a rearward end and are connected to at least some of the bows by flexible joints. An actuator linkage rotates the side rails so that the forward ends of the side rails pivot inwardly to extend transversely relative to the vehicle as the top stack linkage is retracted. The actuator linkage rotates the side rails so that the forward ends of the side rails pivot outwardly to extend longitudinally as the top stack linkage is extended. A flexible cover is secured to the top stack linkage to enclose the passenger compartment when the top stack linkage is extended. The flexible cover is stored with the top stack linkage in the storage area when the convertible top is retracted.

According to another aspect of the present invention, the first bow comprises a central section and right and left side portions. The central section is raised above the forward ends of the side rails when the top is retracted and the right and left side portions are inverted as the side rails pivot inwardly.

According to the invention, the first bow may comprise a central section and right and left side portions. The central section is pivotally connected on opposite lateral ends to one of each of the right and left side portions. The right and left side portions are in turn pivotally connected to the forward ends of the right and left side rails. The right and left side portions are partially rotated in opposite directions as the forward ends of the side rails are pivoted inwardly.

According to yet another aspect of the invention, a second bow may be provided that has a central portion that is longer than the central portion of the first bow and right and left side links that connect the central portion of the second bow to right and left side rails, respectively.

According to another aspect of the invention, the right and left side portions of the first bow are folded to form a pair of pleats in the cover between the central portion and the forward ends of the right and left side rails. The center section, left side portion and left side rail, form a first Z-shaped fold in the cover while the central section, right side portion and right side rail, form an oppositely oriented Z-shaped fold in the cover. The first and second Z-shaped folds become progressively more compact as the top stack is retracted.

According to yet another aspect of the invention, the forward ends of the side rails are juxtaposed to each other when the top stack is fully retracted.

The present invention may also be characterized as a convertible top for a vehicle having right and left side rails each having a back end that is pivotally connected to the right and left main pivot brackets that are secured to right and left sides of the vehicle. The right and left side rails each have distal ends on the opposite ends of the side rails from the main pivot brackets that are moved between a first position wherein the side rails extend longitudinally relative to the vehicle and a second position wherein the side rails extend transversely relative to the vehicle.

According to another aspect of the invention, the convertible top includes a first bow that extends between the distal ends of the right and left side rails that is articulated to allow the distal ends of the side rails to converge as the top is shifted from an extended position to a retracted position. The articulated first bow allows the distal ends of the side rails to diverge as the top is shifted from the retracted position to the extended position.

According to another aspect of the invention, at least one intermediate bow extends between the right and left side rails and is connected to the right and left side rails by right and left links.

According to yet another aspect of the invention, the convertible top includes a flexible cover that is secured to right and left side rails. The cover is folded to form at least one pleat as the top is retracted.

These and other objects and advantages of the present invention will be better understood in view of the attached drawings and following detailed description.

DETAILED DESCRIPTION OF THE PREFERRED EMBODIMENT(S)

Figure 1:
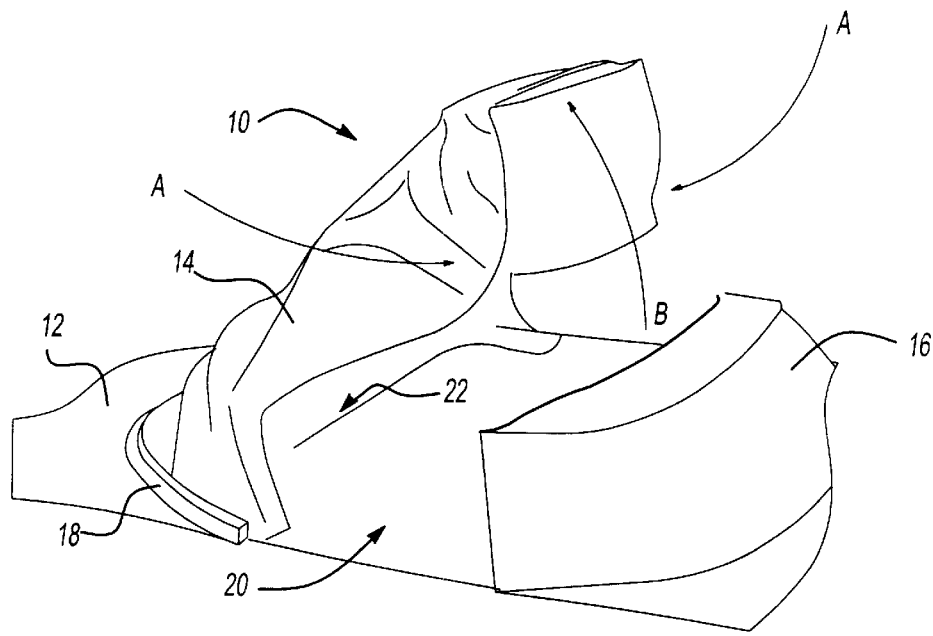
FIG. 1 is a perspective view of the cross folding convertible top of the present invention that is attached to a model base and is in its mid cycle position.

Referring now to FIG. 1, a convertible top 10 for a vehicle 12 is shown at a mid cycle retraction position. The convertible top 10 includes a cover 14. The vehicle 12 shown in FIG. 1 is a model having a portion representative of a windshield 16. The cover 14 of the convertible top is secured to the vehicle 12 by means of a tack strip 18. The convertible top 10 is extended to cover a passenger compartment 20 and may be retracted into a storage compartment 22 located behind the passenger compartment 20.

Figure 2:
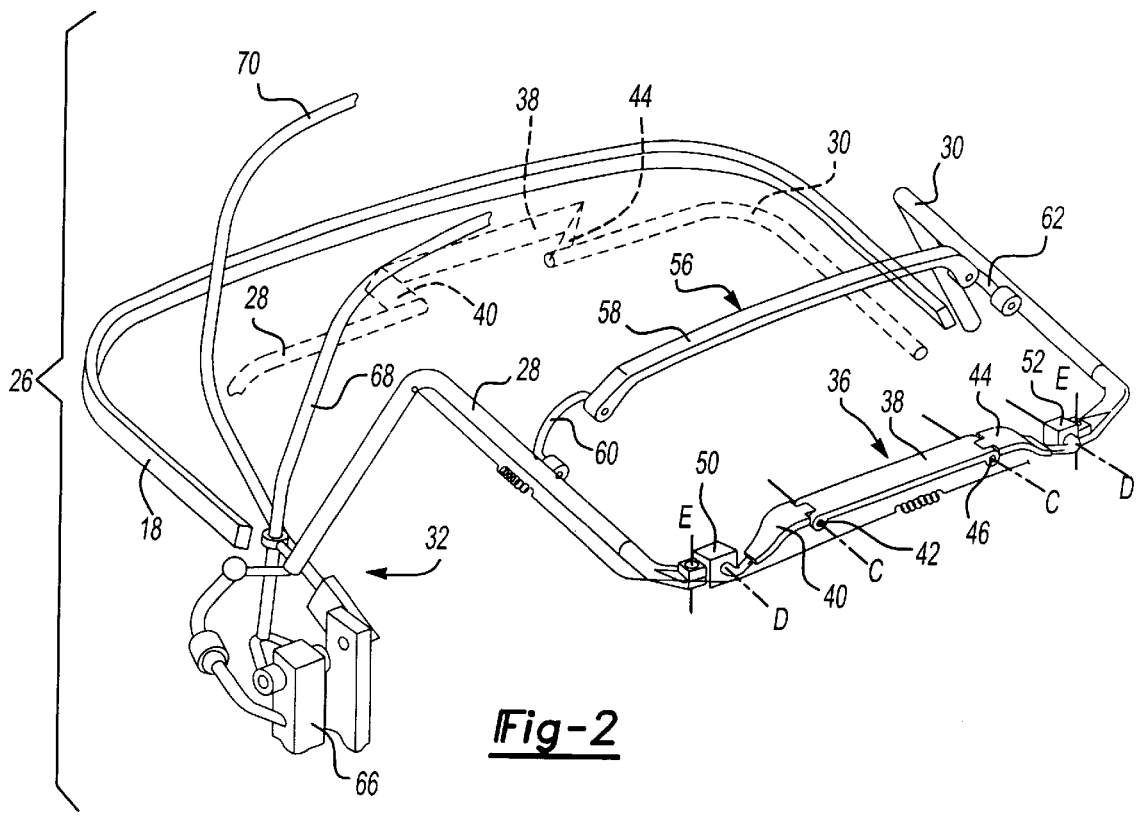
FIG. 2 is a perspective view of the cross folding convertible top of FIG. 1.
Figure 3:
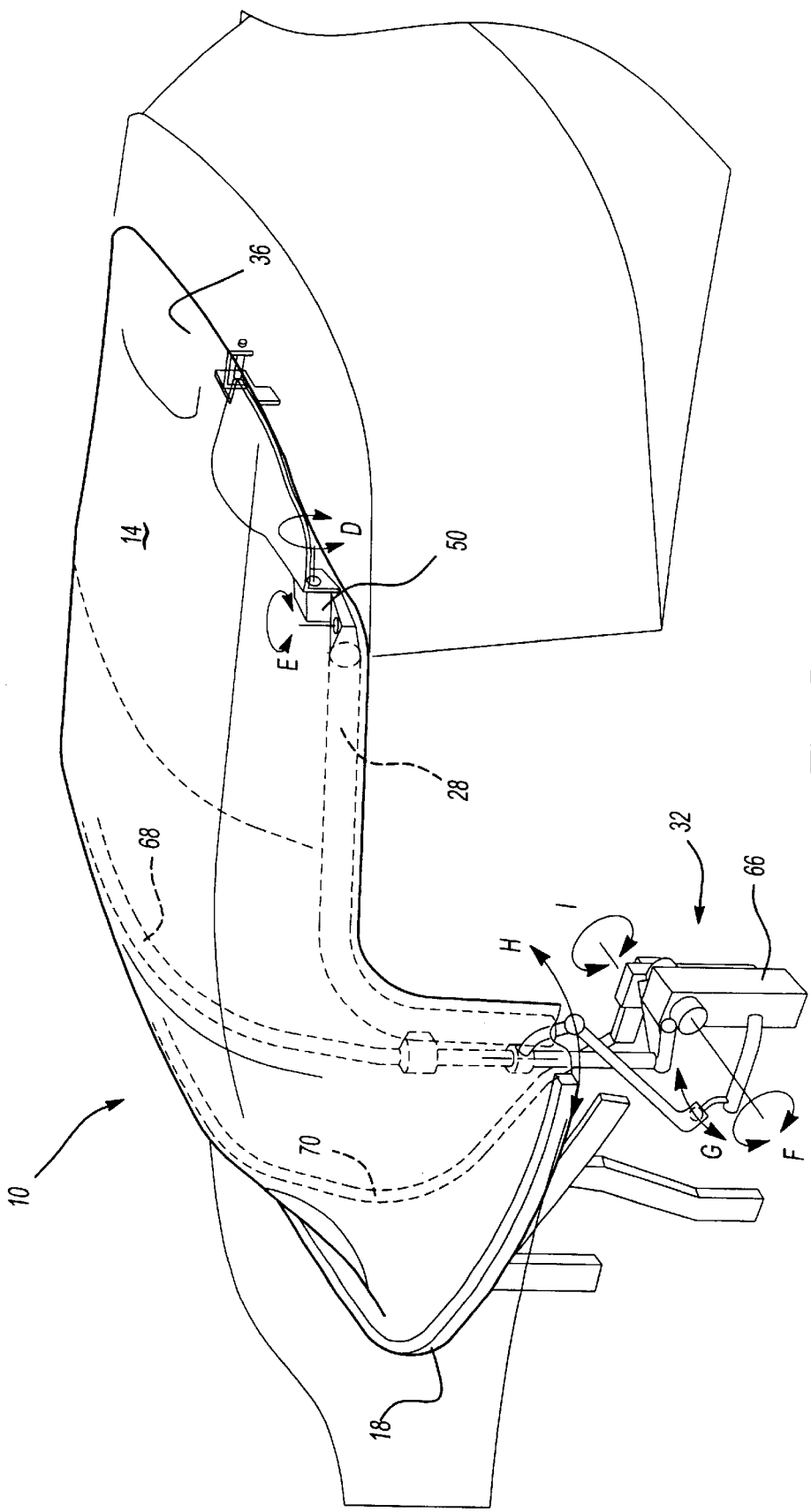
FIG. 3 is a fragmentary perspective view of the top stack linkage of the cross folding convertible top of FIG. 1 with the cover removed.

Referring now to FIG. 2, the model of the convertible top is shown with the cover removed. In FIG. 3, the cover 14 is attached to the convertible top. In FIGS. 1 through 3, the convertible top is shown attached to a model while in FIGS. 4 through 6 the convertible top is shown schematically in conjunction with a vehicle 12. For brevity, the same reference numerals are used for corresponding parts in reference to FIGS. 1 through 3 as for FIGS. 4 through 6 even though the arrangement and configuration of the components are of two embodiments that are not identical.

Referring now to FIGS. 2 and 3, the top stack 26 includes a right side rail 28 and a left side rail 30. The right and left side rails 28, 30 extend from the belt line of the vehicle 12 and around the rear and top portions of the vehicle windows (not shown). The right and left side rails are attached to and moved by right and left main pivots 32, 34.

A one bow 36 extends between the right and left side rails 28, 30. The one bow 36 includes a center segment 38 and a right segment 40 that are connected by a right hinge 42. The one bow 36 also includes a left segment 44 that is connected by left hinge 46 to the center segment 38. The one bow 36 is segmented to permit the right and left side rails 28, 30 to rotate inwardly converging at their front ends as the convertible top 10 as retracted.

The outboard end of the right segment 40 and right side rail 28 are connected by a right multi-axis pivot 50. Left multi-axis pivot 52 is provided to connect the left segment 44 to the left side rail 30.

A two bow 56 interconnects the right and left side rails 28, 30 at a location behind and spaced from the one bow 36. The two bow 56 includes a central portion 58 and is connected to the right side rail 28 by right side link 60 and is connected to the left side rail 30 by left side link 62.

Referring to FIGS. 2 and 3, a post 66 is provided as part of the model. In an actual vehicle, the right and left main pivots 32, 34 would be assembled to the B or C pillar of the vehicle body.

A three bow 68 and four bow 70 are provided between the two bow and the tack strip 18 to support the cover 14 of the convertible top 10.

Referring to FIG. 1, the general folding movement of the convertible top 10 is illustrated wherein the arrows A show the initial movement of the cover 14 as the right and left side rails 28, 30 are pivoted upwardly and inwardly as shown by arrows 8. The center segment 38 of the one bow is lifted upwardly as indicated by arrow B as the top is retracted.

Referring now to FIGS. 2 and 3, the axis of the right and left hinges 42 and 46 are depicted by axis C. Two axes of movement of the right and left multi-axis pivots 50, 52 are illustrated by means of axis lines D and E. The multi-axis pivots 50, 52 rotate about vertical axis E and longitudinal axis D to permit the right and left segments 40, 44 to pivot in two directions relative to the right and left side rails 28, 30. Referring now to FIG. 3, the operation of the main pivot 32 is described in relation to its pivot axes. The top 10 is pivoted upwardly about transverse horizontal axis F that causes the three bow 68 in FIG. 3 to pivot rearwardly. The three bow 68 rotates rearwardly and is rotated by the linkage as depicted by arrows G and H. The multi-axis movement shown by arrows G and H causes the side rail 28 to pivot inwardly to the position shown in FIG. 2 in phantom lines wherein the right and left side rails 28, 30 point transversely across the vehicle and form a two opposed Z-shaped folds at opposite ends of the center segment 38. The four bow 70 pivots around transverse horizontal axis I.

Figure 4:
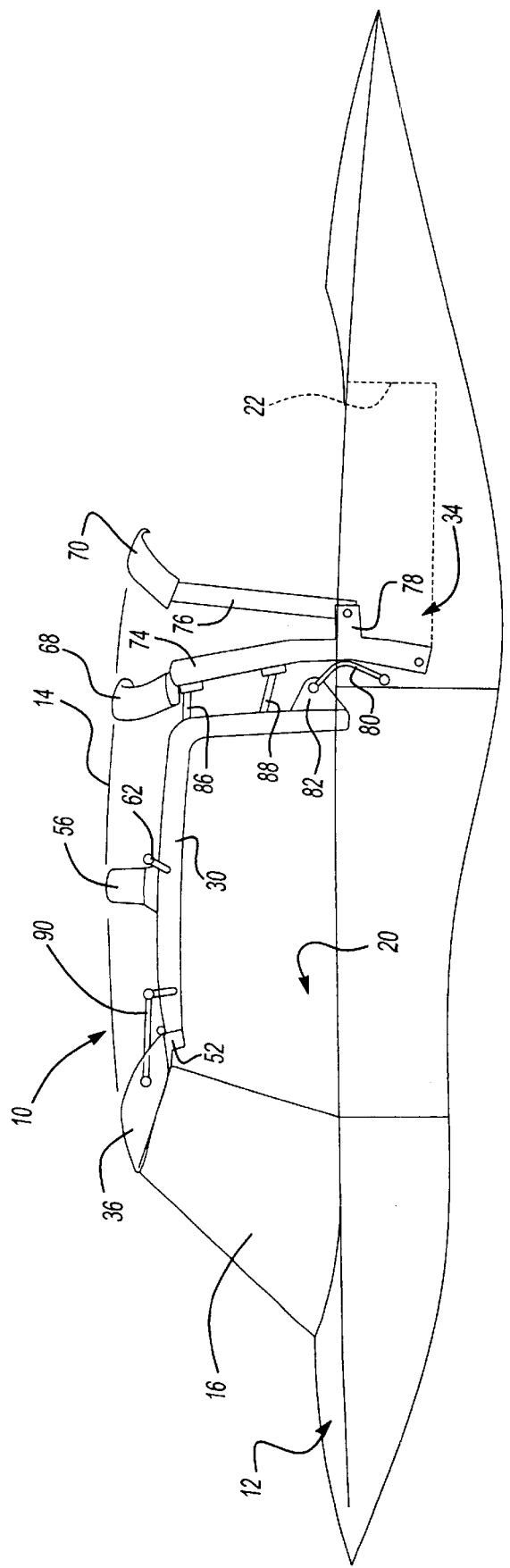
FIG. 4 is a schematic side elevation view of the cross folding convertible top of the present invention that is assembled to a vehicle in its extended position.
Figure 5:
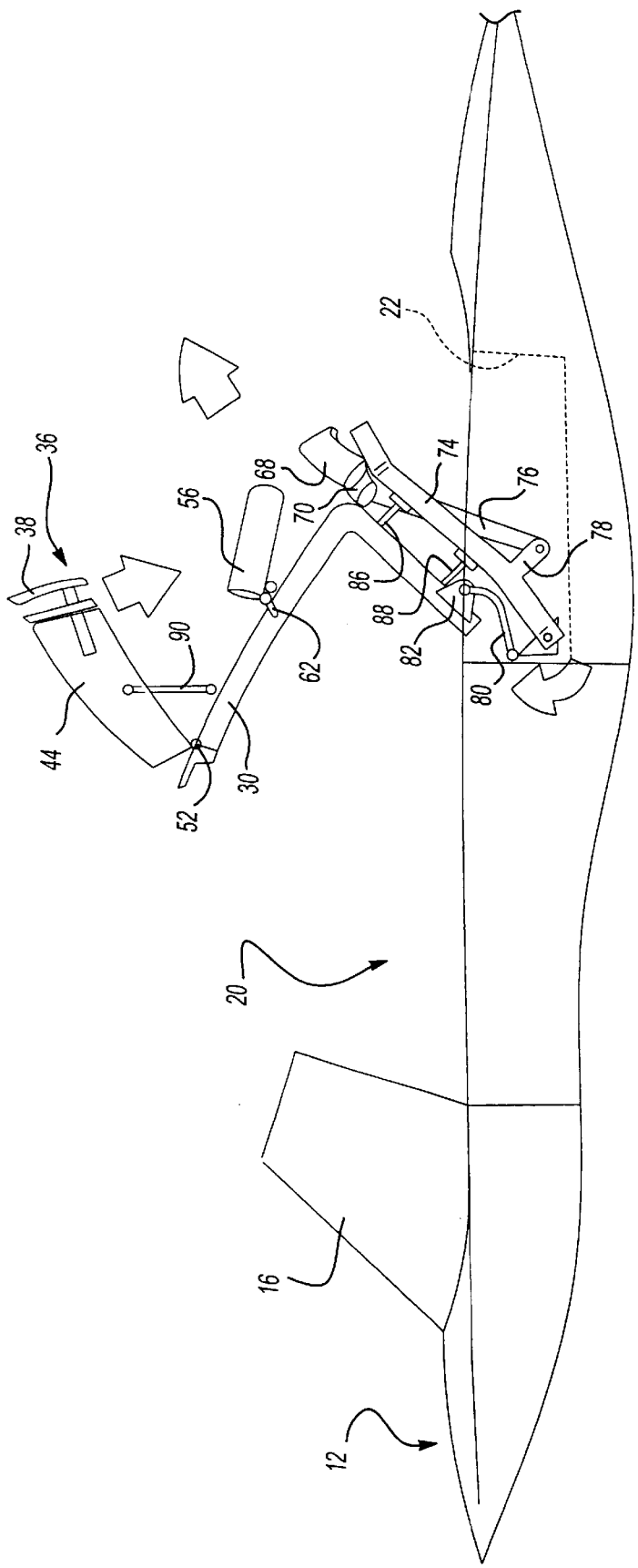
FIG. 5 is a schematic side elevation view of the cross folding convertible top of FIG. 4 in a mid cycle position.
Figure 6:
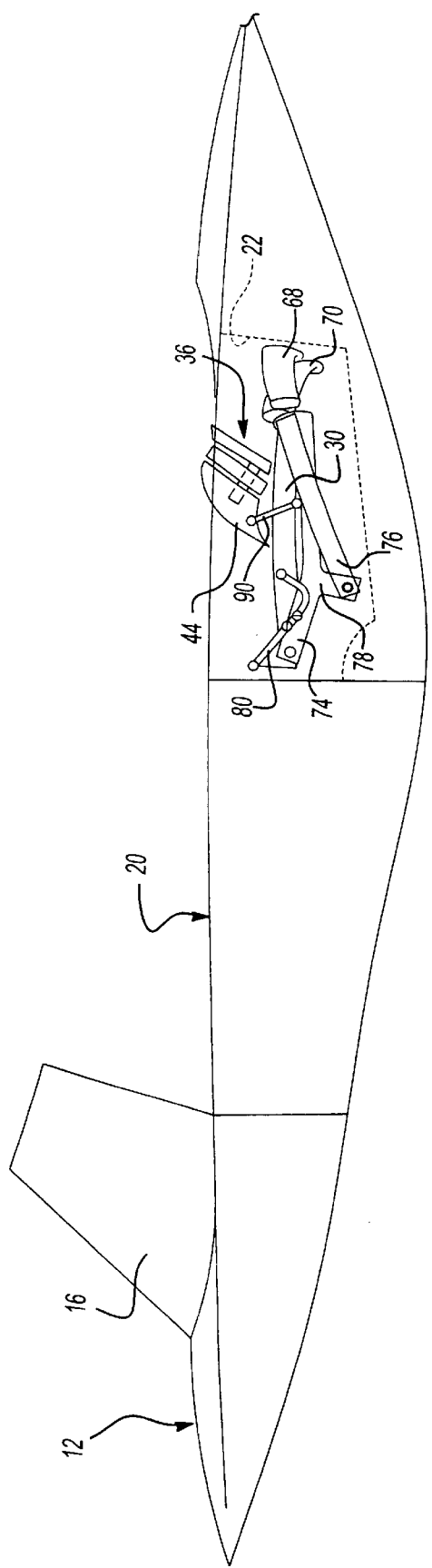
FIG. 6 is a schematic side elevation view showing the cross folding convertible top of FIG. 4 in its retracted position.

Referring now to FIGS. 4 through 6, retraction of the convertible top 10 will be described in reference to a series of schematic drawings showing the convertible top 10 installed on a vehicle 12. The vehicle 12 includes windshield 16 at the forward end of the passenger compartment 20. The storage compartment 22 is shown in phantom lines and is provided to receive the convertible top 10 when it is retracted. In FIG. 4, the cover 14 is partially shown spanning from one bow 36 to four bow 70 but it would also extend to the five bow (not shown) or tack strip 18 as shown in FIGS. 1 and 2.

Initially, the one bow 36 is attached to the header or top of the windshield 16. The side rail 30 is shown extending between the main pivot 34 and the one bow 36.

A convertible top 10 may be either power driven or manually operated. If the top 10 is power driven, a cylinder or other motor may be operatively connected to the main support 74 causing it to pivot from the nearly vertical position shown in FIG. 4 to the horizontal position shown in FIG. 6. As the main support 74 pivots in a clockwise direction from the a position shown in FIG. 4 to the position shown in FIG. 5 to the position shown in FIG. 6, the rear support 76 that supports the four bow 70 is also pivoted rearwardly. The rear support 76 is connected to the main support 74 by an extension 78.

Pivot link 80 is connected to a flange 82 on the left side rail 30 and to the vehicle on its opposite end. As the main support 74 rotates rearwardly, the upper side rail connector 86 and lower side rail connector 88 moves the left side rail 30 rearwardly causing the left multi-axis pivot 52 to be raised and moved inwardly. As this movement is occurring, articulated link 90 connecting a left side rail 30 and one bow 36 cause the right segment 40 and left segment 44 to lift the center segment 38 as the ends of the side rails 28, 30 move toward each other.

The articulated one bow folds to form a pleat in the center of the convertible top 10 with the right and left segments 40, 42 pivoting to an inverted position as the right and left side rails 28, 30 converge. On each side of the top a Z-shaped fold is formed. On the left side a Z-shaped fold is formed by the center segment 38, left segment 44 and left side rail 30. On the right side a Z-shaped fold is formed by the center segment 38, right segment 40 and right side rail 28. Articulated link 90 pulls the left segment 44 rearwardly and lifts it rotating about the D and E axis as previously described with reference to FIGS. 2 and 3.

Referring to FIG. 5, the top stack linkage is shown in a mid cycle position wherein the left side rail 30 is rotated to approximately a 45° angle by the action of the pivot link 80 on the flange 82. The left side rail 30 is pivoted inboard and the one bow is drawn upwardly with the articulated link 90 lifting the left segment 44 into an angular relationship relative to the center segment 38. The two bow 56 is pivoted rearwardly and left side link 62 is shifted to permit the right and left side rails 28, 30 to move toward each other. The rear support 76 is moved under the main support 74 as both are rotated rearwardly.

Referring now to FIG. 6, the top stack 26 is shown fully disposed in the storage compartment 22 with the one bow 36 resting on top of the left side rail 30, main support 74 and rear support 76.

Regarding FIGS. 4–6, it should be understood that corresponding right hand side parts of the top stack 26 are provided but that they cannot be seen generally from the left side.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a vehicle having a passenger compartment and a storage area comprising:
   a top stack linkage moveable between an extended position and a retracted position, the top stack linkage having a plurality of bows that extend transversely between a right side rail and a left side rail, the side rails extending longitudinally relative to the vehicle when the top stack linkage is in the extended position, a first one of the bows being articulated in at least two places and being received by the windshield header, the side rails each having a forward end and a rearward end, the side rails being connected to at least some of the bows by flexible joints;
   an actuator linkage that rotates the side rails so that the forward ends of the side rails pivot inwardly to extend transversely relative to the vehicle as the top stack linkage is retracted, the actuator linkage rotating the side rails so that the forward ends of the side rails pivot outwardly to extend longitudinally as the top stack linkage is extended;
   a flexible cover secured to the top stack linkage encloses the passenger compartment when the top stack linkage is extended and is stored in the storage area when the top stack linkage is retracted.

2. The convertible top of claim 1 wherein the first bow comprises a central section and right and left side portions and wherein the central section is raised above the forward ends of the side rails and the right and left side portions are inverted as the side rails pivot inwardly.

3. The convertible top of claim 1 wherein the first bow comprises a central section and right and left side portions and wherein the central section is pivotally connected on opposite lateral ends to one of each of the right and left side portions, the right and left side portions being pivotally connected to the forward ends of the right and left side rails, respectively, the right and left side portions being partially rotated in opposite directions as the forward ends of the side rails pivot inwardly.

4. The convertible top of claim 3 wherein the right and left side portions form a pair of pleats in the cover between the central portion and the forward ends of the right and left side rails.

5. The convertible top of claim 3 wherein the plurality of bows includes a second bow having a central portion that is longer than the central portion of the first bow and right and left side links connecting the central portion of the second bow to the right and left side rails, respectively.

6. The convertible top of claim 1 wherein the central section, left side portion and left side rail form a first Z shaped fold and the central section, right side portion and right side rail form an oppositely oriented Z shaped fold, the first and second Z shaped folds becoming progressively more compact as the top stack is retracted.

7. The convertible top of claim 1 wherein the forward ends of the side rails are juxtaposed to each other when the top stack is retracted.

8. The convertible top of claim 1 wherein a cable is secured around the perimeter of the cover and at least one spring is connected to the cable to tension the cable when the top stack is extended.

9. A convertible top for a vehicle having right and left side rails each having a back end that is pivotally connected to one of a right main pivot bracket and a left main pivot bracket on right and left sides of the vehicle, the right and left side rails each having distal ends on the opposite ends thereof from the back ends, the distal ends being moved between a first position wherein the side rails extend longitudinally relative to the vehicle and a second position wherein the side rails including the distal ends extend transversely relative to the vehicle.

10. The convertible top of claim 9 further comprising a first bow extending between the distal ends of the right and left side rails, the first bow being articulated to allow the distal ends of the side rails to converge as the top is shifted from an extended position to a retracted position and to allow the distal ends of the side rails to diverge as the top is shifted from the retracted position to the extended position.

11. The convertible top of claim 10 further comprising at least one intermediate bow extending between the right and left side rails and being connected to the right and left side rails by right and left links.

12. The convertible top of claim 9 further comprising a flexible cover secured to the right and left side rails, the cover being folded to form a central pleat as the top is retracted.

* * * * *